Feb. 8, 1949.  J. J. KRIZ, JR  2,460,887
EGG BREAKER
Filed Jan. 10, 1946
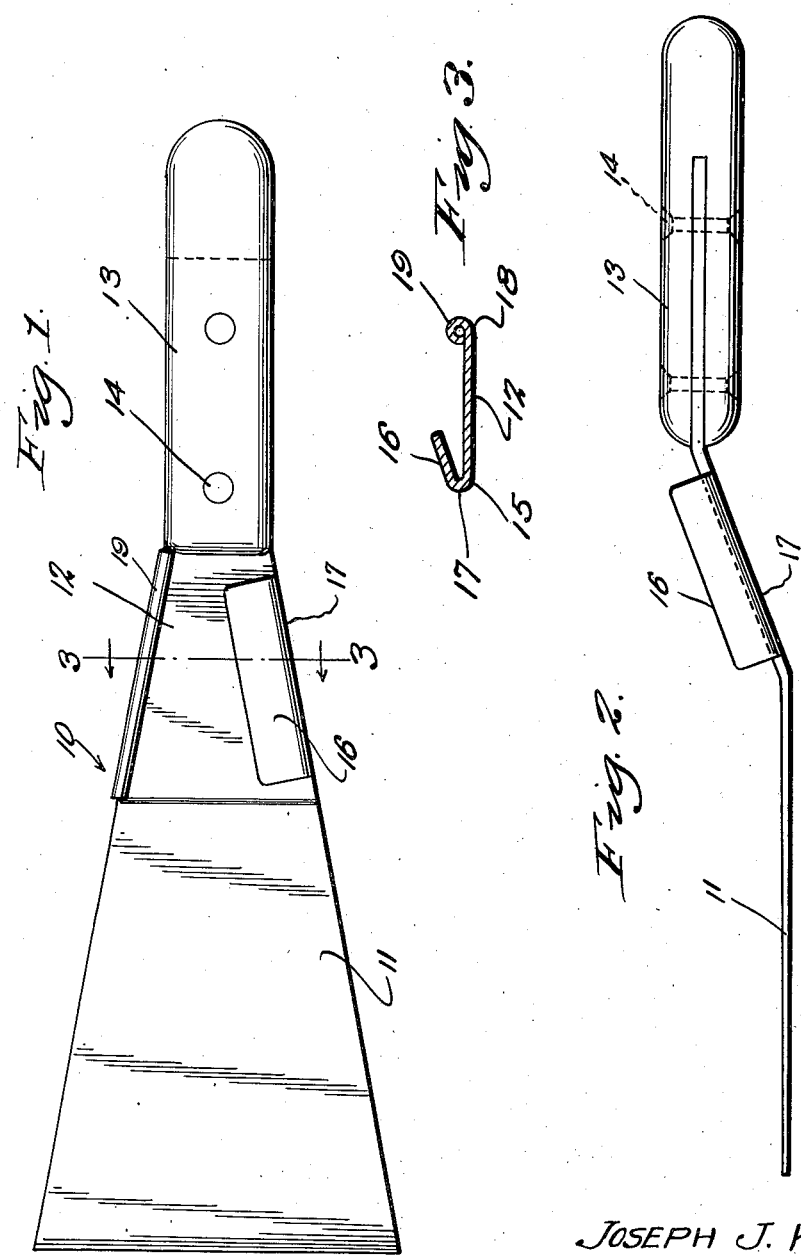
Inventor
JOSEPH J. KRIZ, Jr.
By Clarence A. O'Brien
and Harvey B. Jacobson
Attorneys Patented Feb. 8, 1949

2,460,887

UNITED STATES PATENT OFFICE 2,460,887

EGG BREAKER

Joseph J. Kriz, Jr., Chicago, Ill., assignor of one-half to Paul H. Bombach, Chicago, Ill.

Application January 10, 1946, Serial No. 640,356

1 Claim. (Cl. 146—2)

The invention as described herein, and illustrated in the accompanying drawings, consists of a kitchen article, an object of which is to provide an eggshell breaker and fried egg turner.

Another object of the invention is to provide a spatula having an eggshell cracker thereon.

Another object of the invention is to provide in a kitchen article a device for cracking the shell of an egg and splitting the same.

A primary object of the invention is the provision of means, in combination with an egg turner or other such article, whereby an eggshell may be broken without damage to the yolk of the egg.

Other features and advantages will become more readily apparent from the following description and the accompanying illustrative drawings in which:

Figure 1 is a plan view of the instant invention,

Figure 2 is an edge view thereof, and

Figure 3 is a sectional view on line 3—3 of Figure 1.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10, refers to the invention and 11, indicates a spatula for turning fried eggs and the like and provided with an inclined shank 12, tapering to a reduced portion paralleling the spatula and to which the handle 13, is secured by rivets 14. One edge 15, of the shank is extended and returned upon itself at an acute angle to the surface of the shank as at 16, to form a blunt unobstructed edge, with a rounded portion 17, for cracking eggs, the purpose of which portion is to prevent cutting into and breaking the yolk of an egg. The purpose of the inclination of the member 16, is in order to provide a slight wedge action to spread the two broken halves of the eggshell apart. The edge 18, of the shank 12, is rolled as at 19, in order to provide means for cracking an egg without breaking the yolk and for use when it is not desired to spread the sections of the shell.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

A spatula, a tapered shank having a flat upper surface bent at an angle to the spatula and an egg shell cracking member extending along one edge of the shank, and extending at an acute angle to the surface of the shank and having a blunt unobstructed edge overlying and spaced from the shank a distance less than the diameter of an average egg.

JOSEPH J. KRIZ, JR.

REFERENCES CITED

The following references are of record in the file of this patent:

UNITED STATES PATENTS

| Number | Name | Date |
|--------|------|------|
| 788,989 | Allen | May 2, 1905 |
| 1,221,598 | Roberts | Apr. 3, 1917 |
| 2,143,893 | Mars | Jan. 17, 1939 |